E. JOHNSON.
BALANCE DETECTOR.
APPLICATION FILED AUG. 27, 1912.
1,087,772.
Patented Feb. 17, 1914.
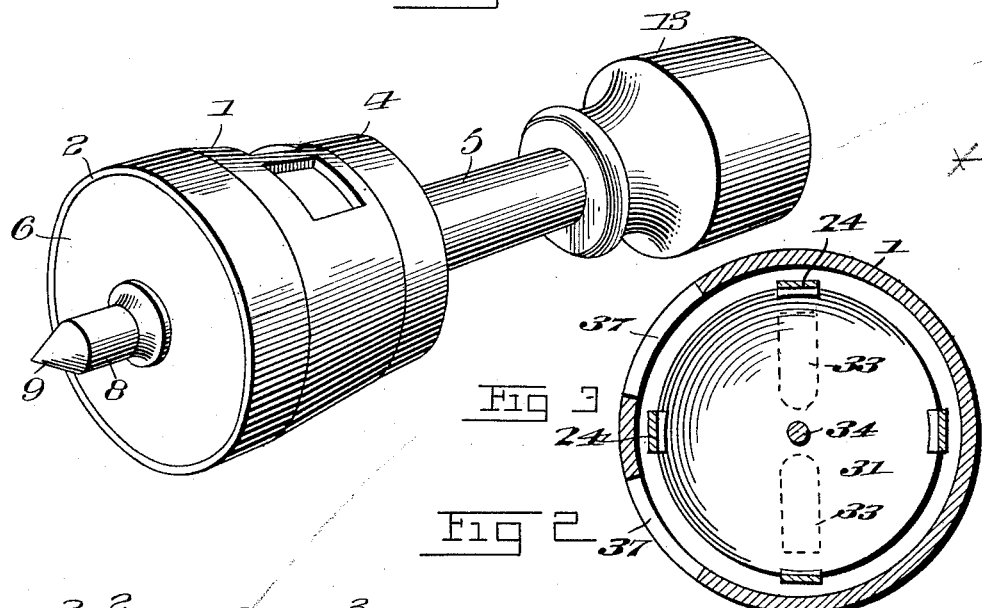
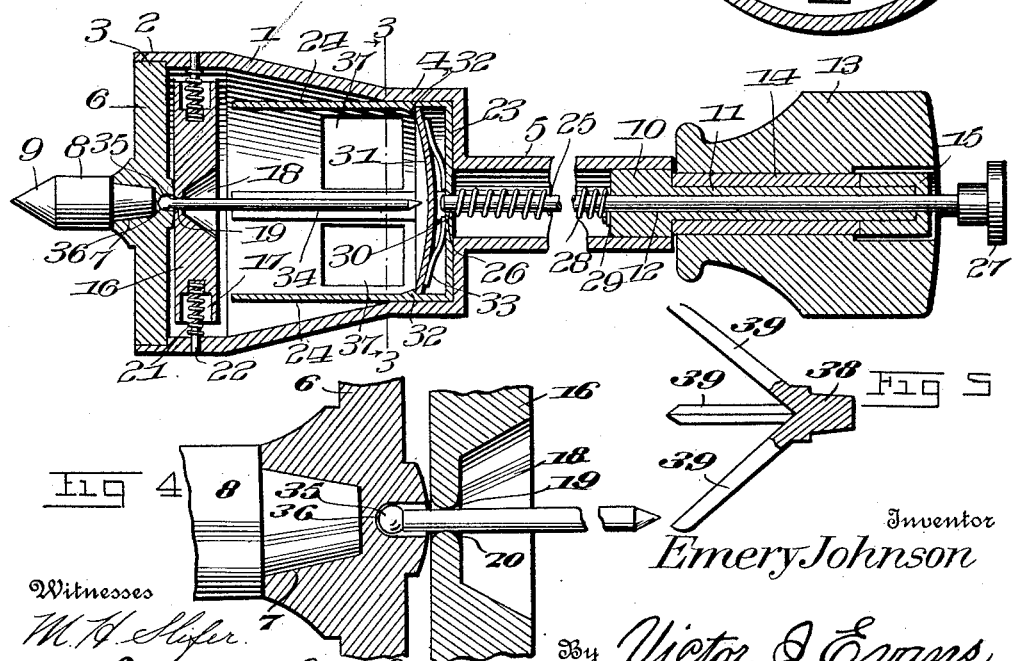

UNITED STATES PATENT OFFICE.

EMERY JOHNSON, OF NEWBERG, OREGON.

BALANCE-DETECTOR.

1,087,772.   Specification of Letters Patent.   Patented Feb. 17, 1914.

Application filed August 27, 1912. Serial No. 717,360.

*To all whom it may concern:*

Be it known that I, EMERY JOHNSON, a citizen of the United States of America, residing at Newberg, in the county of Yamhill and State of Oregon, have invented new and useful Improvements in Balance-Detectors, of which the following is a specification.

This invention relates to improvements in balance detectors and has particular application to a device of the character set forth which is particularly adapted for determining the heavy and light portions of a revolving mass, such, for example, as the armatures of dynamos and motors and the rotating parts of engines, metal and wood working machines and the like.

It is a well known fact that a well balanced body loosely held upon its axis will take its own course when revolving or rotating rapidly even though the axis thereof is unsteady and vibrates, while if unbalanced such body proceeds in a circuitous path, that is, planet fashion.

Therefore, in carrying out the present invention, it is my purpose to provide a balance detector whereby the heavy and light portions of a rotating mass may be readily determined so that the unbalanced portion thereof may be remedied to bring about the even and uniform revolving of the mass.

It is also my purpose to provide a balance detector which will embrace in its construction, among other features, means movable with an unbalanced body or mass, an indicator carried thereby, and means movable with the first-mentioned means and supported upon its axis in such manner as to be free to seek its own axis independently of the axis of the first-mentioned means and which will have control of the indicator thereby enabling the defective portion of the rotating mass to be accurately and readily determined.

With the above and other objects in view, the invention consists in the construction, combination and arrangement of parts hereinafter set forth in and falling within the scope of the claims.

In the accompanying drawings, Figure 1 is a perspective view of a balance detector constructed in accordance with my invention. Fig. 2 is a central longitudinal sectional view through the same. Fig. 3 is a section on the line 3—3 of Fig. 2. Fig. 4 is a fragmentary sectional view of a part of the device, and Fig. 5 is a modified form of bearing member for the detector.

In carrying my invention into practice, the various parts of the balance detector are to be made of light material, such material, being, of course, consistent with strength and durability, so that the device may be easily and conveniently handled and applied to the mass to be tested.

Referring now to the accompanying drawings in detail, the means or mechanism movable with the unbalanced body or mass embodies, in the present instance, a casing or housing 1 having a relatively large open end 2 rabbeted as at 3, and a circumferentially reduced flanged end 4 with which latter is integrally formed, a hollow shank 5 coaxial with the longitudinal axis of the housing or casing. Seated in the rabbeted portion 3 of the relatively large end of the housing and closing such end and suitably fastened therein is a head 6 formed with a centrally disposed socket 7 designed to receive a bearing member 8, the latter, in this instance, having a pointed end 9 designed to engage the center of the rotating or revolving mass to be tested. Rigidly secured, in any appropriate manner, within the free end of the hollow shank 5 is a block 10 provided with an outwardly projecting sleeve 11 communicating with a bore 12 formed in the block 10. Loosely encircling the sleeve 11 is a handle or knob 13 in which is fastened a central bearing bushing 14 encircling the sleeve and held on such sleeve against longitudinal movement thereon by means of a cap 15 fitting over the free end of the sleeve 11 and abutting the bushing 14 of the knob, any suitable form of rigid connection being established between the cap and the adjacent end of the sleeve.

The means, movable with the means or mechanism just described, comprises, in this embodiment of my invention, a balance disk 16 disposed within the housing 1 adjacent to the head 6 thereof and formed with a number of peripheral pockets 17 suitably spaced apart, and a central recess 18 communicating with a relatively small center opening 19 having rounded walls 20 and coaxial with the longitudinal axis of the housing or casing. Seated in each pocket 17 and suitably fastened therein is one end of a spring 21 having the opposite extremities thereof coiled about a pin 22 and suitably fastened thereto, the pins being carried by the adjacent wall of the casing or housing 1. These springs 21 form a universal joint or connection between the balance disk and the housing so that the disk may seek its own axis irrespective of the axis of the housing, when the detector is applied to the mass or body to be tested. It is to be understood, however, that the springs 21 may be eliminated and any suitable form of universal joint employed to hold the balance disk loosely upon its axis.

Mounted within the housing 1 and movable therein is a resetting and indicator actuating device which, in the present instance, consists of a disk 23 seated against the flanged end 4 of the housing and equipped at its periphery with a plurality of right angularly projecting fingers 24 suitably spaced apart around the periphery of the disk and extending into the housing 1 and terminating adjacent to the respective face of the balance disk. Passed centrally through the cap 15, the sleeve 11 and the bore in the block 10, is a stem 25 having one end rigidly secured to the center of the disk 23, as at 26, while the opposite end thereof extends outwardly of the cap 15 and has revolubly mounted thereon a manipulating member 27 whereby the stem, and consequently the disk 23 and the fingers 24 may be moved inwardly of the housing, when such is desired. Any suitable means may be employed to hold the disk 23 against the flanged end of the housing. In this instance, a retractile spring 28 encircles the stem 25 within the hollow shank 5 and has one end fastened to the block 10 as at 29 and the opposite end secured to the disk 23 as at 30, such spring normally acting to hold the disk 23 seated against the flanged end of the housing, and the manipulating disk projected outwardly.

The indicator herein shown consists of a dial 31 supported by the fingers and having the marginal edge thereof abutting stop lugs 32 formed on the fingers, such lugs serving to limit the movement of the dial in one direction relatively to the fingers, leaf springs 33 being disposed between the disk 23 and the adjacent surface of the dial and acting to hold the dial against the stop lugs. The pointer of the indicator is indicated at 34 and has one end passed through the center opening 19 in the balance disk and formed with a ball 35 loosely disposed within a socket 36 formed centrally of the adjacent face of the head 6 and coaxial with the bearing 8.

From the foregoing description taken in connection with the accompanying drawings, the construction, mode of operation and manner of employing my invention will be readily apparent. When it is desired to test a revolving mass or body to detect the heavy and light portions thereof so as to determine whether or not the same is balanced, the balance detector is grasped by an operator at the knob 13 and the point 9 of the bearing 8 engaged with the shaft or the center of the rotating mass so that the detector may rotate with such mass. Should the mass be unbalanced a circuitous or planetary movement will be imparted to the housing 1 whereby such housing and the various devices carried thereby will be caused to vibrate. The balance disk 16, however, will seek its own axis independently of the circuitous movement of the housing and, when so doing, carries the pointer 34 at an angle to the longitudinal center line of the housing. With the parts in this position, the manipulating disk 27 is pushed inwardly of the device with the effect to move the dial 31 against the adjacent end of the pointer 34, thereby holding the pointer on the dial. Upon the dial contacting with the pointer, the same remains stationary while the fingers 24 move forwardly incident to the yieldable connections between the disk 23 and the dial, and engage the balance disk 16 thereby holding the same stationary. Subsequent to this operation of the balance detector, the revolving mass is brought to a standstill, and the position of the mass in alinement with the pointer will be found to be lighter than that part of the mass opposite, thereby enabling the defective portion of the mass being tested to be remedied. Suitable sight openings 37 are formed in the housing 1 so that the position of the pointer with respect to the dial may be readily and conveniently seen.

In some instances, it may be found impractical or inconvenient to locate the exact center of a shaft supporting a revolving mass. When such circumstances arise, use is made of the bearing illustrated in Fig. 5, wherein the bearing is composed of a plug 38 adapted to be inserted in the socket 7 of the head 6, and a plurality of outwardly diverging fingers 39 adapted to embrace the marginal edge of the end of the shaft.

It will be seen that I have provided a balance detector which embraces means movable with an unbalanced body, an indicator carried by such means, and means movable with the first means and capable of finding its own axis irrespective of the axis of the first means and having control of the indicator whereby the heavy and light portions of the mass to be tested may be readily, conveniently and accurately determined.

While I have herein shown and described one preferred form of my invention by way of illustration, I desire it to be understood that I do not limit myself to the precise details of construction herein described and delineated, as modification and variation may be made within the scope of the claims and without departing from the spirit of the invention.

I claim:

1. A balance detector comprising means adapted to be rotated by an unbalanced revolving body, an indicator carried by said means, and means actuated by and movable with the first means and adapted to assume its own axis of revolution and controlling said indicator.

2. A balance detector comprising means adapted to be rotated by an unbalanced revolving body, an indicator carried by said means and including relatively movable elements, means actuated by and movable with the first means and adapted to assume its own axis independently of the axis of the first means and controlling one element of the indicator, and means operable manually to move the other element of the indicator whereby the defective portion of the mass being tested may be determined.

3. A balance detector comprising means adapted to be rotated by an unbalanced revolving body, an indicator carried by said means and including relatively movable elements, means actuated by and movable with the first means and adapted to assume its own axis independently of that of the first means and controlling one element of the indicator, and means controlling the remaining element of the indicator and the second-named means whereby the defective portion of the mass being tested may be determined.

4. A balance detector comprising a housing adapted to be rotated by an unbalanced revolving body, a bearing member for the longitudinal axis of the housing and adapted to axially aline the housing with the body to be balanced, an indicator within the housing and including relatively movable elements, means within the housing and actuated by and movable therewith and adapted to assume its own axis and controlling one element of said indicator, and means operable manually to move the remaining element of the indicator and engage the last-named means whereby the defective portion of the body being tested may be determined.

5. A balance detector comprising a housing adapted to be moved by an unbalanced revolving body, a bearing member for the longitudinal axis of the housing adapted to axially aline the housing with the body to be balanced, an indicator within the housing and including relatively movable elements, means within the housing and actuated by and movable therewith and adapted to assume its own axis and controlling one element of said indicator, means operable manually to move the remaining element of the indicator and engage the last-named means whereby the defective portion of the body being tested may be determined, and a knob for holding said detector against the body being tested.

6. A balance detector comprising a housing adapted to be rotated by an unbalanced revolving body, a bearing member for the longitudinal axis of the housing and adapted to axially aline the housing with the body to be balanced, an indicator within the housing, a balance disk within the housing and movable therewith and adapted to seek its own axis independently of the housing and controlling said indicator, and universal connections between said balance disk and housing.

7. A balance detector comprising means adapted to be rotated by an unbalanced revolving body, and means actuated by and movable with the first means and adapted to assume its own axis of revolution, whereby the unbalanced portions of said body may be determined.

In testimony whereof I affix my signature in presence of two witnesses.

EMERY JOHNSON.

Witnesses:
 A. C. STANBROUGH,
 L. F. HALL.